United States Patent
Ou

(10) Patent No.: US 12,530,419 B2
(45) Date of Patent: Jan. 20, 2026

(54) DATA MANAGEMENT APPARATUS, DATA MANAGEMENT METHOD, AND NON-TRANSITORY RECORDING MEDIUM

(71) Applicant: Sekin Ou, Tokyo (JP)

(72) Inventor: Sekin Ou, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/178,859

(22) Filed: Mar. 6, 2023

(65) Prior Publication Data

US 2023/0297637 A1 Sep. 21, 2023

(30) Foreign Application Priority Data

Mar. 18, 2022 (JP) .................... 2022-044643

(51) Int. Cl.
  *G06F 7/02* (2006.01)
  *G06F 16/00* (2019.01)
  *G06F 16/93* (2019.01)
  *G06F 16/9538* (2019.01)

(52) U.S. Cl.
  CPC .......... *G06F 16/9538* (2019.01); *G06F 16/93* (2019.01)

(58) Field of Classification Search
  CPC .............................. G06F 16/9538; G06F 16/93
  See application file for complete search history.

(56) References Cited

U.S. PATENT DOCUMENTS

| 7,716,332 | B1* | 5/2010 | Topfl | G06F 16/9574 |
| | | | | 709/224 |
| 10,460,376 | B1* | 10/2019 | Krakowiecki | G06Q 40/00 |
| 2013/0159183 | A1* | 6/2013 | Lopez | G06Q 20/042 |
| | | | | 705/42 |
| 2016/0180336 | A1* | 6/2016 | Jinno | G06Q 20/3224 |
| | | | | 705/38 |
| 2021/0320804 | A1* | 10/2021 | Wang | H04L 9/0894 |
| 2022/0255998 | A1* | 8/2022 | Lee | H04L 67/1021 |
| 2023/0122838 | A1* | 4/2023 | Li | G06F 16/176 |
| | | | | 707/610 |
| 2024/0054451 | A1* | 2/2024 | Song | G06Q 10/087 |

FOREIGN PATENT DOCUMENTS

| JP | H09-204442 | 8/1997 |
| JP | 9-311862 | 12/1997 |

OTHER PUBLICATIONS

Extended European Search Report for 23159769.1 mailed on Jun. 20, 2023.

(Continued)

*Primary Examiner* — Bruce M Moser
(74) *Attorney, Agent, or Firm* — IPUSA, PLLC

(57) ABSTRACT

A data management apparatus includes circuitry to transmit access information for accessing data stored in a memory to an information processing apparatus via a network, receive, from an information processing terminal via the network, an acquisition request to acquire the data, the acquisition request being transmitted in response to a user operation to the access information on the information processing terminal connected to the information processing apparatus via the network, and transmit screen information for displaying the data generated based on the access information included in the acquisition request to the information processing terminal.

4 Claims, 11 Drawing Sheets

(56) References Cited

OTHER PUBLICATIONS

Lukic Dragan: "Beginners Guide to NextCloud (3 Minutes to Master)", Aug. 9, 2020, pp. 1-6, XP093038465, retrieved from the Internet: URL:http://web.archive.org/web/20200809000342/https://help.rapidseedbox.com/en/articles/1451701-beginners-guide-to-nextcloud-3-minutes-to-master.
Office Action dated Apr. 23, 2024 issued with respect to the corresponding European Patent Application No. 23159769.1.
Anonymous: "Scaling web application across multiple services", Mar. 12, 2017, pp. 1-2, XP093152861, retrieved from the Internet: URL:https://web.archive.org/web/20170312092117/http://serverfault.com/questions/574853/scaling-web-application-across.multiple-services.
Japanese Office Action for 2022-044643 mailed on Oct. 21, 2025.

\* cited by examiner

FIG. 8

| DOCUMENT ID | INVOICE DESTINATION | INVOICE NO. | INVOICE DATE | INVOICE AMOUNT |
|---|---|---|---|---|
| ID-A | SAMPLE COMPANY | S001 | 2022/1/31 | JPY 29,1600 |
| ID-C | AAA COMPANY | S002 | 2022/1/20 | JPY 56,500 |
| ID-E | COMPANY XXX | S003 | 2022/3/15 | JPY 1,234,567 |
| ... | ... | ... | ... | ... |

FIG. 9

| DOCUMENT ID | FILE INFORMATION |
|---|---|
| ID-A | ID-A.pdf |
| ID-C | ID-C.pdf |
| ID-E | ID-E.xlsx |
| ... | ... |

FIG. 10

| SLIP ID | ACCESS INFORMATION |
|---|---|
| ID-B | https://XXX/ID-A.pdf |
| ID-D | https://XXX/ID-C.pdf |
| ID-F | https://XXX/ID-E.xlsx |
| ... | ... |

FIG. 11

| SLIP NO. | SLIP DATE | INPUT DATE | INPUT OPERATOR | NO. OF STATEMENT | STICKY NOTE | SUPERIOR APPROVER |
|---|---|---|---|---|---|---|
| 1 | R-03/08/31 | R-03/10/29 | OPERATOR A | | | |
| 5 | R-03/10/01 | R-03/12/06 | OPERATOR A | 1 | | |
| 6 | R-03/10/01 | R-03/12/06 | OPERATOR A | 1 | | |
| 7 | R-03/10/01 | R-03/12/06 | OPERATOR A | 1 | | |
| 8 | R-03/10/01 | R-03/12/06 | OPERATOR A | 1 | | |
| 9 | R-03/10/01 | R-03/12/06 | OPERATOR A | 1 | | |
| 10 | R-03/10/01 | R-03/12/06 | OPERATOR A | 1 | | |
| 11 | R-03/10/01 | R-03/12/06 | OPERATOR A | 1 | | |
| 12 | R-03/10/01 | R-03/12/06 | OPERATOR A | 1 | | |
| 13 | R-03/10/01 | R-03/12/06 | OPERATOR A | 1 | | |
| 14 | R-03/10/01 | R-03/12/06 | OPERATOR A | 1 | | |
| 15 | R-03/10/01 | R-03/12/06 | OPERATOR A | 1 | | |

SLIP DATE  TERM  R-03/04/01  -  R-04/03/31
SLIP NO.  1  ~  99999

TOTAL (F5)

| REGISTRATION/REVISION DATE AND TIME | MONTHLY JOURNAL | FINANCE |
|---|---|---|
| DELETION DATE AND TIME | | |
| DISPLAYED SLIP | 1 / 68 | |

| | | | APPROVER SEAL 1 | APPROVER SEAL 2 | APPROVER SEAL 3 | APPROVER SEAL 4 |
|---|---|---|---|---|---|---|
| DEBIT AMOUNT | DEBIT ACCOUNT/SUBSIDY/ TAX CLASSIFICATION/DEPARTMENT | ABSTRACT | CREDIT ACCOUNT/SUBSIDY/ TAX CLASSIFICATION/DEPARTMENT | | | CREDIT AMOUNT |

TOTALIZED

FIG. 12

[FINANCE] — 2100

| SLIP DATE | R-03/08/31 | | | | DEBIT: [ ] | | |
|---|---|---|---|---|---|---|---|
| SLIP NO. | 1 | | | | CREDIT: [ ] | | |

2110

| DEBIT AMOUNT | DEBIT ACCOUNT/SUBSIDY/ TAX CLASSIFICATION/ DEPARTMENT | | | ABSTRACT | CREDIT ACCOUNT/SUBSIDY/ TAX CLASSIFICATION/ DEPARTMENT | | | CREDIT AMOUNT |
|---|---|---|---|---|---|---|---|---|
| JPY 55,000 | 111 | CASH | EXEMPT | | 150 | BILL RECEIVABLE | EXEMPT | JPY 55,000 |
| | 000 | COMMON DEPARTMENT | | ID-A — 2111 | 000 | COMMON DEPARTMENT | | |
| | | | | | | | | |
| | | | | | | | | |
| JPY 55,000 | | | TOTAL | BALANCE | 0 | | | JPY 55,000 |

3 / 999

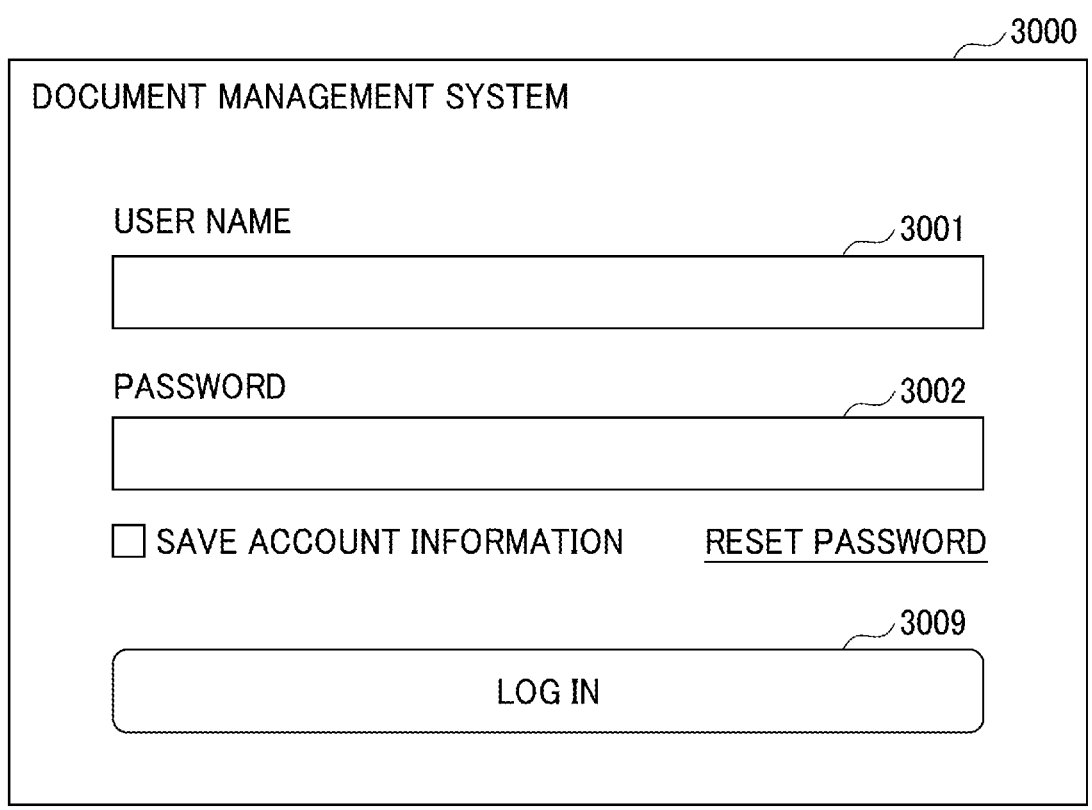

FIG. 14

| DOCUMENT MANAGEMENT SYSTEM | | | | |
|---|---|---|---|---|
| DOCUMENT TRAY | SEARCH | LIST | TASK | FOLDER |

TRANSACTION DOCUMENT (RECEIVED) ×
< SEARCH CHANGE

| TYPE | DOCUMENT TYPE | COUNTERPARTY | INVOICE NO. |
|---|---|---|---|
| INVOICE | | SAMPLE COMPANY | S001 |

《 < 1 > 》 100

∨ | INVOICE 1/2 ⊖ ⊕ ×

INVOICE
(SUBJECT TO REDUCED TAX RATE)

INVOICE NO. S001
INVOICE DATE 2021/8/31

SAMPLE COMPANY
ZIP CODE: 000-0000
TOKYO, MEGURO-KU,
KAMIMEGURO, 12-34-56
FOUR SEASONS BUILDING 3F

ACCOUNTANT/
GENERAL AFFAIRS SECTION
MR. TARO YAMADA

CLIENT COMPANY
ZIP CODE: 123-4567
TOKYO, MEGURO-KU,
KAMIMEGURO, 1-2-3
SAMPLE BUILDING 5F
TEL. 03-1234-5678
E-mail: sample@sample.co.jp
OPERATOR: TARO SAMPLE

COM-
PANY
SEAL

| NO. | ITEM | QUAN-TITY | UNIT | UNIT PRICE | AMOUNT |
|---|---|---|---|---|---|
| 1 | DELIVERY PIZZA | 30 | SHEET | JPY 4,000 | JPY 120,000 |
| 2 | LUNCH (LUNCH BOX) | 30 | PIECE | JPY 2,000 | JPY 60,000 |
| 3 | SUSHI TAKEOUT | 30 | SET | JPY 3,000 | JPY 90,000 |
| 4 | | | | | |
| 5 | | | | | |

SUB TOTAL JPY 270,000
CONSUMPTION TAX (8%) JPY 21,600
TOTAL JPY 291,600
PAYMENT DUE DATE 2021/9/30

TRANSFER DESTINATION DETAILS
AA BANK BB BRANCH
SAVINGS ACCOUNT 12345678

REMARKS

INVOICE  xlsx  20 KB

↻

DATA MANAGEMENT APPARATUS, DATA MANAGEMENT METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-044643, filed on Mar. 18, 2022, in the Japan Patent Office, the entire disclosure of which is hereby incorporated by reference herein.

BACKGROUND

Technical Field

The present disclosure relates to a data management apparatus, a data management method, and a non-transitory recording medium.

Related Art

A document management system for electronically managing data such as a document is used. Also, a document processing system for executing predetermined processing on data using information representing the contents of the data is used. A document management apparatus included in such a document management system and an information processing apparatus included in such a document processing system are linked with each other so that the information processing apparatus uses the information representing the contents of the data managed by the document management to execute the predetermined processing on the data.

Some document processing systems allow searching for information in a drill-down form. As such an information searching technique, there is disclosed a technique that enables a document processing system to separate search processing and definition of searchable items to increase a degree of freedom in the designation order of search items in performing a drill-down searching.

SUMMARY

In one aspect, A data management apparatus includes circuitry to transmit access information for accessing data stored in a memory to an information processing apparatus via a network, receive, from an information processing terminal via the network, an acquisition request to acquire the data, the acquisition request being transmitted in response to a user operation to the access information on the information processing terminal connected to the information processing apparatus via the network, and transmit screen information for displaying the data generated based on the access information included in the acquisition request to the information processing terminal.

In another aspect, a data management method includes transmitting access information for accessing data stored in a memory to an information processing apparatus via a network, receiving, from an information processing terminal via the network, an acquisition request to acquire the data, the acquisition request being transmitted in response to a user operation to the access information on the information processing terminal connected to the information processing apparatus via the network, and transmitting screen information for displaying the data generated based on the access information included in the acquisition request to the information processing terminal.

In another aspect, a non-transitory recording medium carrying computer readable codes for controlling a computer system to perform a method. The method includes transmitting access information for accessing data stored in a memory to an information processing apparatus via a network, receiving, from an information processing terminal via the network, an acquisition request to acquire the data, the acquisition request being transmitted in response to a user operation to the access information on the information processing terminal connected to the information processing apparatus via the network, and transmitting screen information for displaying the data generated based on the access information included in the acquisition request to the information processing terminal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8 is a table illustrating an example of document information according to an embodiment of the present disclosure;

FIG. 9 is a table illustrating an example of metadata of a document according to an embodiment of the present disclosure;

FIG. 10 is a table illustrating an example of metadata of slip information according to an embodiment of the present disclosure;

FIG. 11 is a diagram illustrating an example of a slip list screen according to an embodiment of the present disclosure;

FIG. 12 is a diagram illustrating an example of a slip detail screen according to an embodiment of the present disclosure;

FIG. 13 is a diagram illustrating an example of an authentication screen according to an embodiment of the present disclosure; and FIG. 14 is a diagram illustrating an example of a document browsing screen according to an embodiment of the present disclosure.

Figure 1:
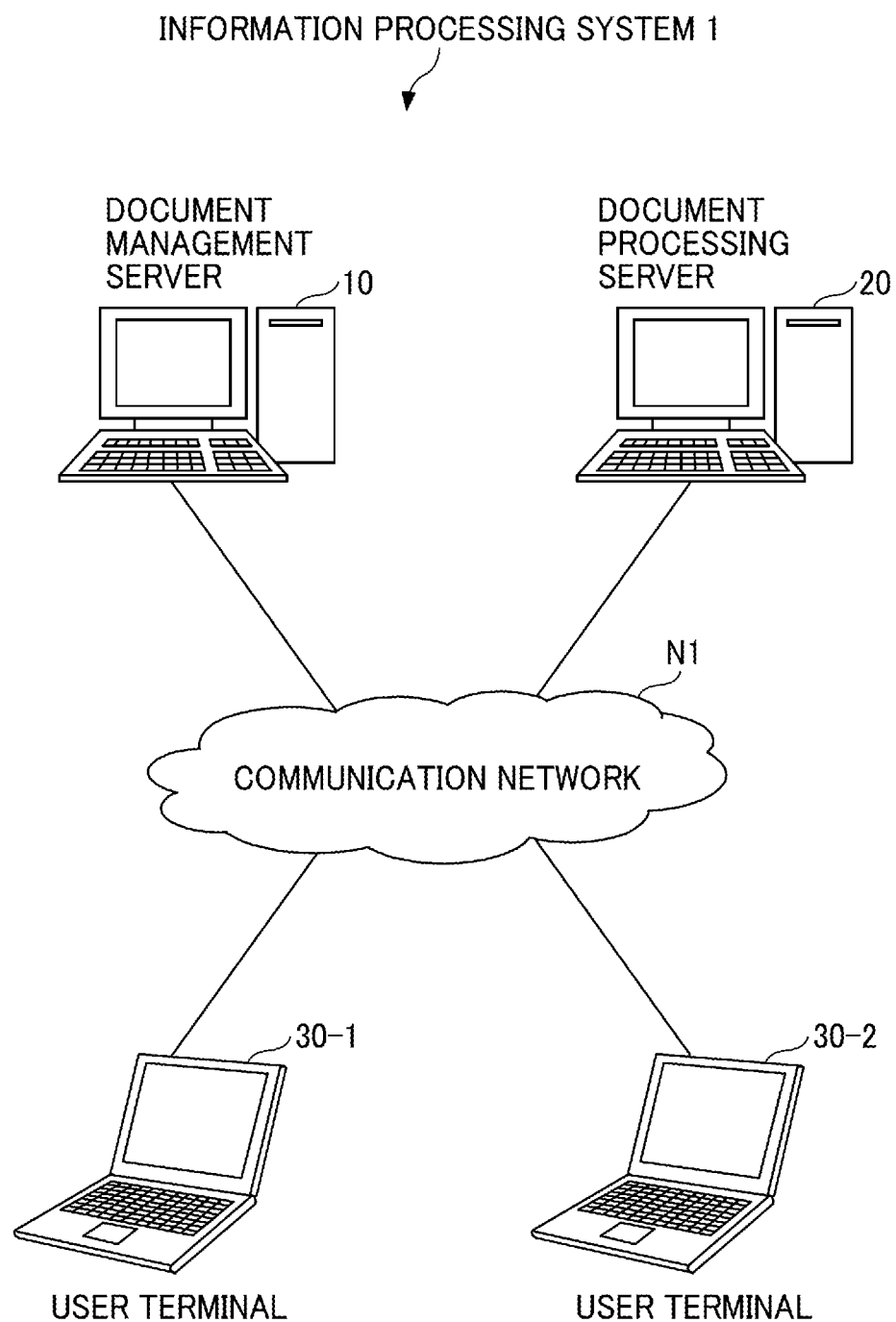
FIG. 1 is a schematic diagram illustrating an example of an overall configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an embodiment of the present disclosure is described in detail with reference to the drawings. In the description of the drawings, the same elements are denoted by the same reference numerals, and redundant descriptions thereof are omitted.

According to an embodiment of the present disclosure, an information processing system includes a document management server and a document processing server, which communicate with each other via a communication network. The document management server manages documents. The document processing server executes predetermined processing on a document using information representing the contents of the document (hereinafter also referred to as document information).

In the information processing system according to the present embodiment, the document management server and the document processing server cooperate with each other. Specifically, the document processing server uses document information representing the contents of a document managed by the document management server to execute the predetermined processing on the document.

A user who operates the document processing server to execute the processing on a document using document information sometimes desires to refer to the body of the document. However, since the document processing server does not have the body of the document, the user needs to search the document management server for the desired document.

On the other hand, the information required to search for a document on the document management server varies depending on the contents of the document. For this reason, the user has to grasp in advance a location where information necessary for searching for the document exists.

In the information processing system according to the present embodiment, the document management server transmits access information for accessing the document to the document processing server together with the document information. The document processing server stores identification information for identifying the document information and the access information in association with each other, and includes the access information in a screen for executing the processing on the document using the document information.

A user terminal transmits an acquisition request to acquire the document to the document management server in accordance with an operation to the access information on the screen which the document processing server provides the user terminal with. In response to the acquisition request received from the user terminal, the document management server provides the user terminal with a screen for displaying the document.

The document according to the present embodiment is electronic data representing the contents of the document or the like. The electronic data represents the contents of not only a document but also any information such as a text, an image, or a moving image.

The document processing server according to the present embodiment is assumed to be an accounting system that executes accounting processing using accounting information such as details indicated on a slip such as an invoice. Note that the processing to be executed by the document processing server is not limited to the accounting processing, and may be any processing to be electronically executed using information on the contents of a document.

Overall Configuration of Information Processing System

A description is given of an overall configuration of an information processing system according to the present embodiment with reference to FIG. 1. FIG. 1 is a schematic diagram illustrating an example of an overall configuration of the information processing system according to the present embodiment.

As illustrated in FIG. 1, an information processing system 1 according to the present embodiment includes a document management server 10, a document processing server 20, a user terminal 30-1, and a user terminal 30-2. The user terminal 30-1 and the user terminal 30-2 are referred to as user terminals 30 when the user terminal 30-1 and the user terminal 30-2 are referred to without distinction or collectively, and one thereof is referred to as a user terminal 30.

The document management server 10, the document processing server 20, and the user terminals 30 are connected to a communication network N1. Each apparatus or device is communicably connected to one another via the communication network N1.

The communication network N1 is implemented by, for example, a wired communication network such as the Internet, a local area network (LAN), or a wide area network (WAN). The communication network N1 may include not only the wired communication network but also a wireless communication network such as a wireless LAN or a short-range wireless communication, or a mobile communication network such as Worldwide Interoperability for Microwave Access (WiMAX), Long Term Evolution (LTE), or the fifth generation (5G).

The document management server 10 electronically manages a document generated in business. The document management server 10 stores metadata and the document in association with each other to enable efficient retrieval of the document. In addition, the document management server 10 has a function of executing a workflow for doing business, and efficiently enables, for example, a document circulation flow.

The document management server 10 may be implemented by one information processing apparatus or may be a system implemented by a plurality of information processing apparatuses.

The document processing server 20 electronically executes predetermined processing on a document using the contents representing the document. The document processing server 20 according to the present embodiment executes accounting processing using, for example, slip information such as details indicated on a slip such as an invoice.

The document processing server 20 may be implemented by one information processing apparatus or may be a system implemented by a plurality of information processing apparatuses.

The user terminal 30-1 is an electronic device used by a user (requester) who uses the document management server 10. The requester uses the user terminal 30-1 to operate the document management server 10. In the present embodiment, the requester is a person in charge of accounting who uses the document management server 10 to manage a slip such as an invoice subjected to the accounting processing.

The user terminal 30-2 is an electronic device used by a user (processing executor) who uses the document processing server 20. The processing executor uses the user terminal 30-2 to operate the document processing server 20. In the present embodiment, the processing executor is an accountant who uses the document processing server 20 to execute the accounting processing using slip information such as details indicated on a slip such as an invoice.

An example of the document management server 10, the document processing server 20, and the user terminals 30 is a computer. Another example of the user terminals 30 is an image forming apparatus such as a printer, a facsimile machine, a digital multifunction peripheral/product/printer (MFP), or a scanner. Note that each of the document management server 10, the document processing server 20, and the user terminals 30 may be any information processing apparatus or image forming apparatus having a communication function.

Each of the user terminals 30 may be, for example, a projector, an interactive white board (IWB; an electronic white board having a blackboard function capable of mutual communication), an output device such as a digital signage, a head-up display (HUD) device, an industrial machine, an imaging device, a sound collecting device, a medical device, a network home appliance, an automobile (connected car), a laptop personal computer (PC), a mobile phone, a smartphone, a tablet terminal, a game console, a personal digital assistant (PDA), a digital camera, a wearable PC, or a desktop PC.

Hardware Configuration of Information Processing System

Figure 2:
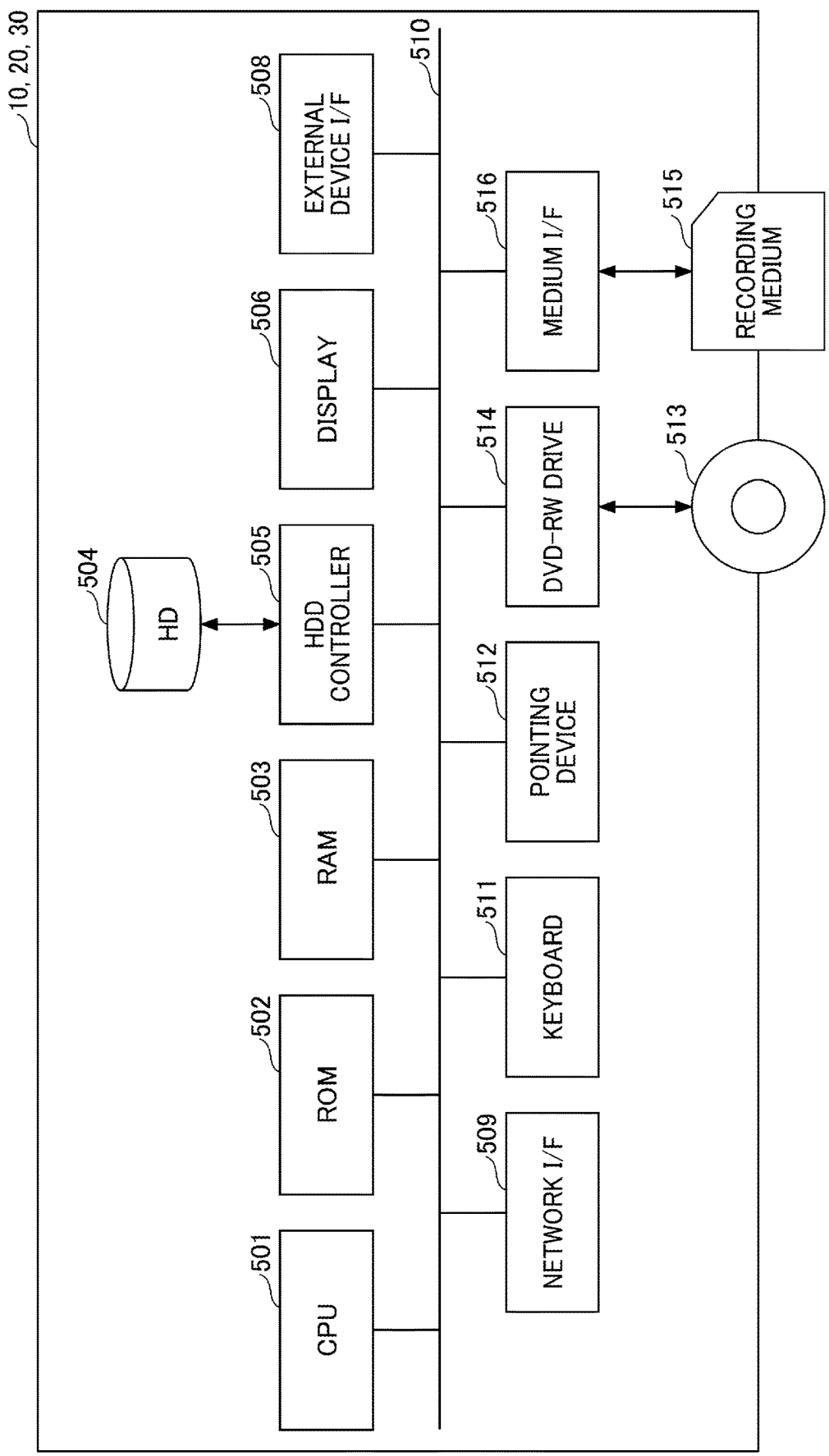
FIG. 2 is a block diagram illustrating an example of a hardware configuration of a computer according to an embodiment of the present disclosure.
Figure 3:
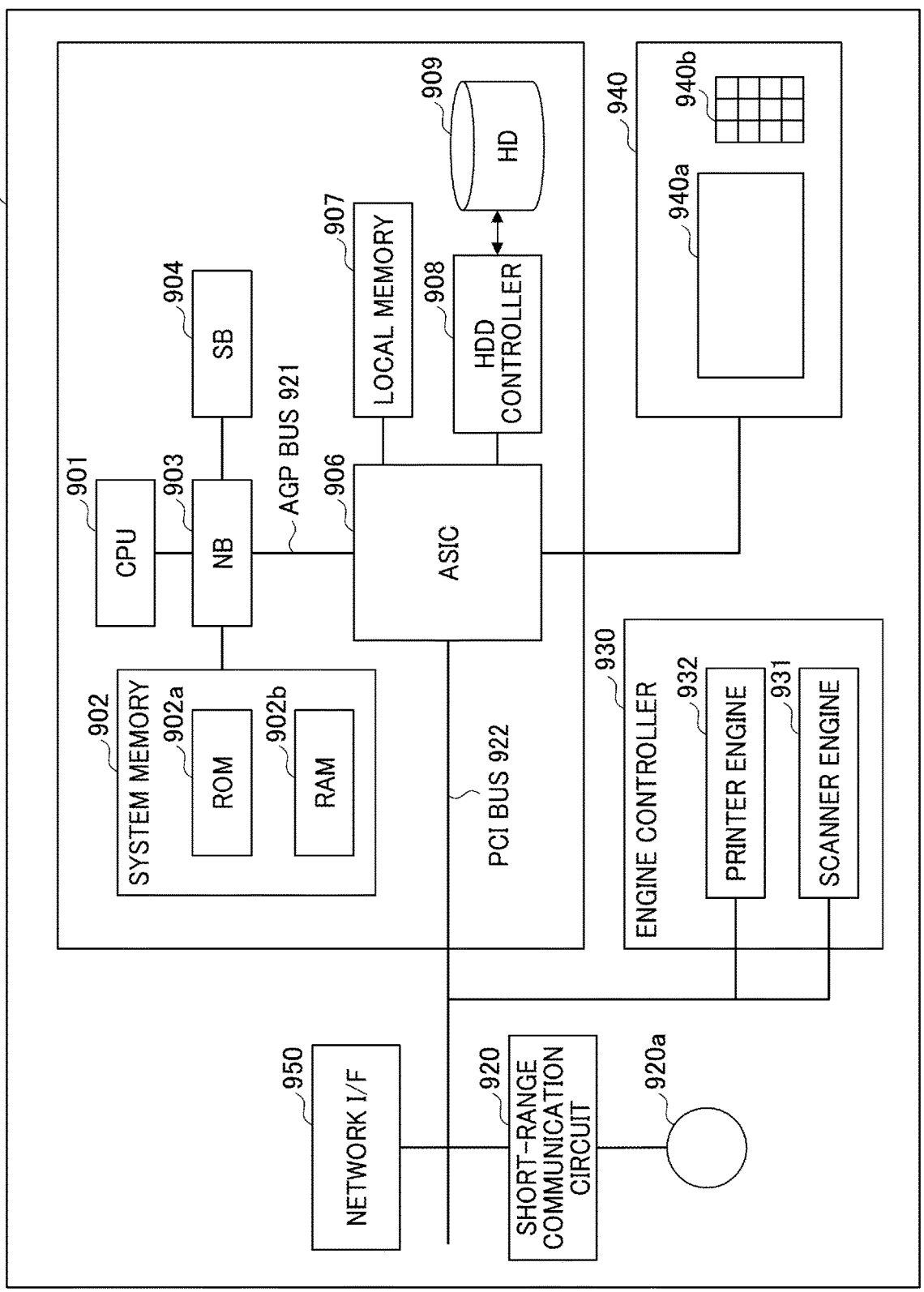
FIG. 3 is a block diagram illustrating an example of a hardware configuration of a multifunction peripheral (MFP) according to an embodiment of the present disclosure.

A description is given of a hardware configuration of each apparatus included in the information processing system according to the present embodiment with reference to FIGS. 2 and 3.

Hardware Configuration of Computer

FIG. 2 is a block diagram illustrating an example of a hardware configuration of the information processing system in a case where each of the document management server 10, the document processing server 20, and the user terminals 30 is implemented as a computer.

As illustrated in FIG. 2, the computer according to the present embodiment includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a data bus 510, a keyboard 511, a pointing device 512, a digital versatile disc rewritable (DVD-RW) drive 514, and a medium I/F 516.

The CPU 501 controls entire operation of the computer. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501.

The display 506 displays various information such as a cursor, a menu, a window, characters, and images. The external device I/F 508 is an interface for connection with various external devices. Examples of the external devices include, but are not limited to, a universal serial bus (USB) memory and a printer. The network I/F 509 is an interface for data communication through the communication network N1. The data bus 510 is an address bus or a data bus, which electrically connects each component illustrated in FIG. 2 such as the CPU 501.

The keyboard 511 is an example of an input device including a plurality of keys for inputting characters, numerical values, various instructions, and the like. The pointing device 512 is an example of an input device that allows a user to select or execute various instructions, select an object for processing, and move a cursor being displayed. The DVD-RW drive 514 controls reading and writing of various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a recording medium 515 such as a flash memory.

Hardware Configuration of MFP

FIG. 3 is a block diagram illustrating an example of a hardware configuration of the information processing system in a case where each of the user terminals 30 is implemented as an MFP. As illustrated in FIG. 3, the MFP according to the present embodiment includes a controller 910, a short-range communication circuit 920, an engine controller 930, a control panel 940, and a network I/F 950.

The controller 910 includes a CPU 901 as a main processor, a system memory 902, a north bridge (NB) 903, a south bridge (SB) 904, an application specific integrated circuit (ASIC) 906, a local memory 907 as a storage area, an HDD controller 908, and an HD 909 as a storage area. The NB 903 and the ASIC 906 are connected via an accelerated graphics port (AGP) bus 921.

The CPU 901 is a processor that controls entire operation of the MFP. The NB 903 is a bridge for connecting the CPU 901 with the system memory 902, the SB 904, and the AGP bus 921. The NB 903 includes a memory controller for controlling reading and writing of various data from and to the system memory 902, a peripheral component interconnect (PCI) master, and an AGP target.

The system memory 902 includes a ROM 902a as a memory that stores a program and data for implementing various functions of the controller 910. The system memory 902 further includes a RAM 902b used as a memory to load the program and the data, or as a memory for loading drawing data for printing. The program stored in the ROM 902a may be stored in any computer-readable recording medium, such as a compact disc read only memory (CD-ROM), a compact disc recordable (CD-R), or a digital versatile disc (DVD), in a file format installable or executable by a computer, for distribution.

The SB 904 is a bridge for connecting the NB 903 to PCI devices and peripheral devices. The ASIC 906 is an integrated circuit (IC) for image processing applications including hardware elements for image processing and has a role of a bridge connecting the AGP bus 921, a PCI bus 922, the HDD controller 908, and the local memory 907 each other. The ASIC 906 includes a PCI target, an AGP master, an arbiter (ARB) as a central processor of the ASIC 906, a memory controller to control the local memory 907, a plurality of direct memory access controllers (DMACs), and a PCI unit. The DMACs rotate image data by converting coordinates of the image data with, for example, a hardware logic. The PCI unit transfers data between a scanner engine 931 and a printer engine 932 via the PCI bus 922. The ASIC 906 may be connected to a USB interface, the Institute of Electrical and Electronics Engineers 1394 (IEEE1394) interface, or both.

The local memory 907 is a local memory used as a copy image buffer and a code buffer. The HD 909 is a storage for storing image data, font data used during printing, and forms. The HDD controller 908 controls reading and writing of various data from and to the HD 909 under control of the CPU 901. The AGP bus 921 is a bus interface for a graphics accelerator card, which has been proposed to accelerate graphics processing. Through directly accessing the system memory 902 by high-throughput, speed of the graphics accelerator card is improved.

The short-range communication circuit 920 includes a short-range communication antenna 920a. The short-range communication circuit 920 is a communication circuit in compliance with the near field communication (NFC), BLUETOOTH, or the like.

The engine controller 930 includes the scanner engine 931 and the printer engine 932. The control panel 940 includes a panel display 940a and an operation panel 940b. The panel display 940a is, for example, a touch panel that displays current settings or a selection screen and receives a user input. The operation panel 940b includes, for example, a numeric keypad and a start key. The numeric keypad receives assigned values of image forming parameters such as an image density parameter. The start key receives an instruction to start copying, for example. The controller 910 controls entire operation of the MFP. For example, the controller 910 controls rendering, communication, or user inputs from the control panel 940. The scanner engine 931 or the printer engine 932 includes an image processing unit for error diffusion, gamma conversion, and the like.

The MFP may sequentially switch to select a document server function, a copying function, a printing function, and a facsimile communication function by an application switching key of the control panel 940. When the document server function is selected, a document server mode is set, when the copying function is selected, a copy mode is set, when the printing function is selected, a printer mode is set, and when the facsimile communication function is selected, a facsimile mode is set.

The network I/F 950 is an interface for data communication through the communication network N1. The short-range communication circuit 920 and the network I/F 950 are electrically connected to the ASIC 906 via the PCI bus 922.

Functional Configuration of Information Processing System

Figure 4:
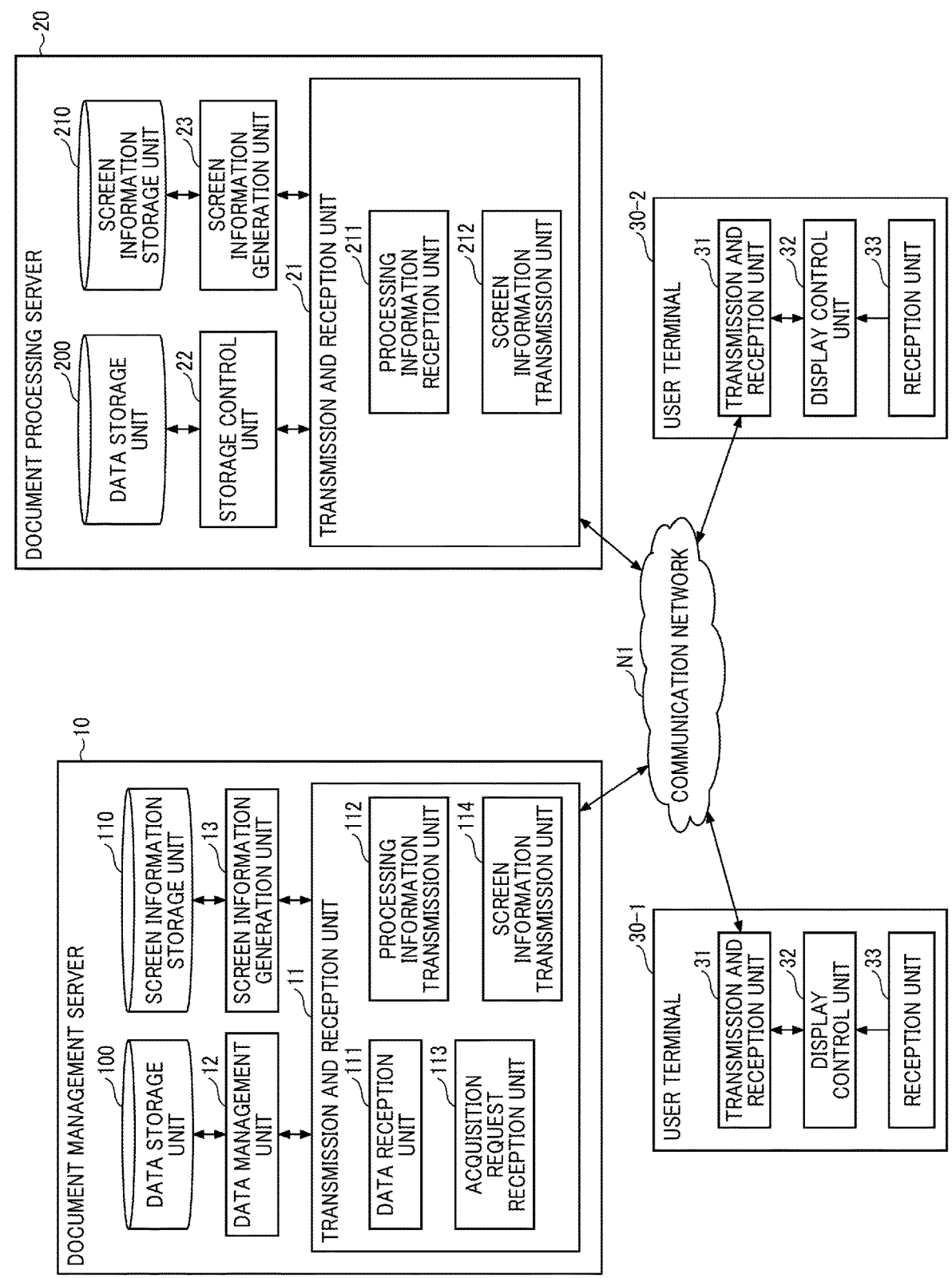
FIG. 4 is a block diagram illustrating an example of a functional configuration of the information processing system according to an embodiment of the present disclosure.

A description is given of a functional configuration of the information processing system according to the present embodiment with reference to FIG. 4. FIG. 4 is a block diagram illustrating an example of a functional configuration of the information processing system according to the present embodiment.

Functional Configuration of Document Management Server

As illustrated in FIG. 4, the document management server 10 according to the present embodiment includes a transmission and reception unit 11, a data management unit 12, a screen information generation unit 13, a data storage unit 100, and a screen information storage unit 110. The transmission and reception unit 11 according to the present embodiment includes a data reception unit 111, a processing information transmission unit 112, an acquisition request reception unit 113, and a screen information transmission unit 114.

The transmission and reception unit 11 is implemented by, for example, processing executed by the CPU 501 and the network I/F 509 according to a program loaded from the HD 504 onto the RAM 503. These elements are illustrated in FIG. 2.

The data management unit 12 and the screen information generation unit 13 are implemented by, for example, processing executed by the CPU 501 and the HDD controller 505 according to a program loaded from the HD 504 onto the RAM 503. These elements are illustrated in FIG. 2.

The data storage unit 100 and the screen information storage unit 110 are implemented by using, for example, the HD 504 illustrated in FIG. 2. Reading and writing of data from and to the HD 504 are performed, for example, via the HDD controller 505.

The transmission and reception unit 11 transmits and receives various data to and from other servers or devices via the communication network N1.

The data reception unit 111 receives a document and document information from the user terminal 30-1. In addition, the data reception unit 111 requests the data management unit 12 to store the document received from the user terminal 30-1. Further, the data reception unit 111 requests the processing information transmission unit 112 to transmit the document information received from the user terminal 30-1 to the document processing server 20.

The processing information transmission unit 112 transmits the document information and access information to the document processing server 20. The document information of the present embodiment is information representing the document stored in the data storage unit 100. The access information of the present embodiment is information for accessing the document stored in the data storage unit 100.

The document information is information representing the contents of the document. For example, assuming that the document is a slip such as an invoice, the document information includes an invoice address, an invoice number, an invoice date, an invoice amount, and the like described in the slip.

The access information is, for example, information indicating a storage location of the document in the document management server 10. Hereinafter, the access information is also referred to as "storage location information." Specifically, the access information is a link such as a uniform resource locator (URL) indicating the location of the document in the document management server 10. Alternatively, the access information may be identification information (ID) for identifying the document in the document management server 10. Hereinafter, the identification information is also referred to as "document ID."

The processing information transmission unit 112 can transmit the document information and the access information to the document processing server 20, for example, via an Application Programming Interface (API) provided by the document processing server 20.

The processing information transmission unit 112 may transmit the document information and the access information simultaneously to the document processing server 20, or may transmit the document information and the access information separately to the document processing server 20.

The acquisition request reception unit 113 receives an acquisition request to acquire the document stored in the data storage unit 100 from the user terminal 30-2. The acquisition request includes the access information for accessing the document.

In response to the acquisition request from the user terminal 30-2, the screen information transmission unit 114 transmits screen information generated by the screen information generation unit 13 to the user terminal 30-2. The screen information generated by the screen information generation unit 13 is information representing a screen for operating the document management server 10.

The data management unit 12 stores the document and metadata in the data storage unit 100 in association with each other. Specifically, the data management unit 12 stores the document received from the user terminal 30-1 in the data storage unit 100. At this time, the data management unit 12 issues document ID for identifying the document and stores the document ID in the metadata of the document to store the document and the document ID in association with each other.

In response to the acquisition request from the user terminal 30-2, the screen information generation unit 13 generates screen information representing a document browsing screen to be transmitted to the user terminal 30-2. The screen information generation unit 13 embeds the document stored in the data storage unit 100 into the screen information representing the document browsing screen stored in the screen information storage unit 110 to generate the screen information representing the document browsing screen.

The data storage unit 100 stores the document managed by the document management server 10 and the metadata of the document in association with each other. The document stored in the data storage unit 100 is a body of an electronic file representing the contents of the document. The document is stored in the data storage unit 100 in a file format corresponding to a file system of the data storage unit 100. The metadata of the document is stored in a metadata table.

The screen information storage unit 110 stores the screen information to be transmitted by the screen information transmission unit 114 to the user terminal 30-2. Each piece of the screen information stored in the screen information storage unit 110 is described in, for example, hypertext markup language (HTML), and may include an application described in JAVASCRIPT or the like.

Functional Configuration of Document Processing Server

As illustrated in FIG. 4, the document processing server 20 according to the present embodiment includes a transmission and reception unit 21, a storage control unit 22, a screen information generation unit 23, a data storage unit 200, and a screen information storage unit 210. The transmission and reception unit 21 according to the present embodiment includes a processing information reception unit 211 and a screen information transmission unit 212.

The transmission and reception unit 21 is implemented by, for example, processing executed by the CPU 501 and the network I/F 509 according to a program loaded from the HD 504 onto the RAM 503. These elements are illustrated in FIG. 2.

The storage control unit 22 and the screen information generation unit 23 are implemented by, for example, processing executed by the CPU 501 and the HDD controller 505 according to a program loaded from the HD 504 onto the RAM 503. These elements are illustrated in FIG. 2.

The data storage unit 200 is implemented by using, for example, the HD 504 illustrated in FIG. 2. Reading and writing of data from and to the HD 504 are performed, for example, via the HDD controller 505.

The transmission and reception unit 21 transmits and receives various data to and from other servers or devices via the communication network N1.

The processing information reception unit 211 receives the document information and the access information from the document management server 10. Then, the processing information reception unit 211 requests the storage control unit 22 to store the document information and the access information received from the document management server 10.

In response to the acquisition request from the user terminal 30-2, the screen information transmission unit 212 transmits screen information generated by the screen information generation unit 23 to the user terminal 30-2. The screen information generated by the screen information generation unit 23 is information representing a screen for operating the document processing server 20.

The storage control unit 22 stores the document and the metadata of the document in the data storage unit 200 in association with each other. Specifically, the storage control unit 22 generates slip information subjected to the processing based on the document information received from the document management server 10, and stores the slip information in the data storage unit 200. At this time, the storage control unit 22 issues identification information for identifying the slip information (hereinafter also referred to as "slip ID") and stores the access information in the metadata of the slip information to store the slip ID and the access information in association with each other.

In response to the acquisition request from the user terminal 30-2, the screen information generation unit 23 generates screen information representing a slip processing screen to be transmitted to the user terminal 30-2. The screen information generation unit 23 embeds the slip information and the access information stored in the data storage unit 200 into the screen information representing the slip processing screen stored in the screen information storage unit 110 to generate the screen information representing the slip processing screen.

The data storage unit 200 stores the slip information managed by the document processing server 20 and the metadata of the slip information in association with each other. The slip information is stored in a slip information table. The metadata of the slip information is stored in a metadata table.

Functional Configuration of User Terminals

As illustrated in FIG. 4, each of the user terminals 30 according to the present embodiment includes a transmission and reception unit 31, a display control unit 32, and a reception unit 33.

The transmission and reception unit 31 is implemented by, for example, processing executed by the CPU 501 and the network I/F 509 according to a program loaded from the HD 504 onto the RAM 503. These elements are illustrated in FIG. 2.

The display control unit 32 is implemented by, for example, processing executed by the CPU 501 and the display 506 according to a program loaded from the HD 504 onto the RAM 503. These elements are illustrated in FIG. 2.

The reception unit 33 is implemented by, for example, processing executed by the CPU 501 and the keyboard 511 or the pointing device 512 according to a program loaded from the HD 504 onto the RAM 503. These elements are illustrated in FIG. 2.

The transmission and reception unit 31 transmits and receives various data to and from other servers or devices via the communication network N1.

The display control unit 32 displays a screen for operating a server based on screen information received by the transmission and reception unit 31 from the server.

The reception unit 33 receives various operations performed by a user. The operations performed by the user include an operation to input a file in which electronic data is recorded.

Information Processing Method

Figure 5:
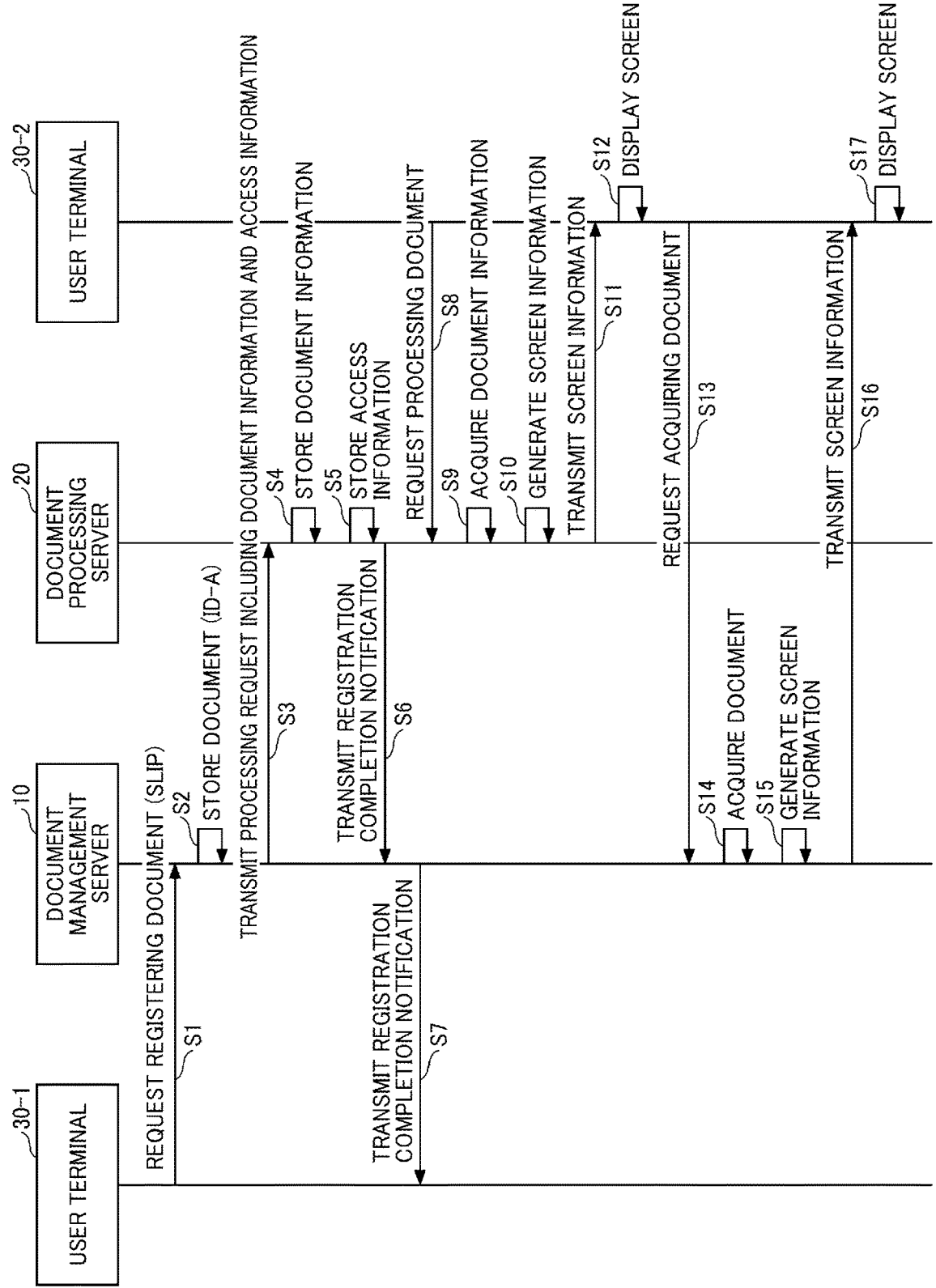
FIG. 5 is a sequence chart illustrating an example of an information processing method according to an embodiment of the present disclosure.

A description is given of an example of an information processing method executed by the information processing system according to the present embodiment with reference to FIG. 5. FIG. 5 is a sequence chart illustrating the information processing method according to the present embodiment.

In step S1, the display control unit 32 included in the user terminal 30-1 displays on, for example, the display 506, a document registration screen in response to an operation by the requester. The display control unit 32 may authenticate the requester prior to displaying the document registration screen, and display the document registration screen in a case where the authentication is successful. In the following description, it is assumed that the requester is successfully authenticated.

Figure 6:
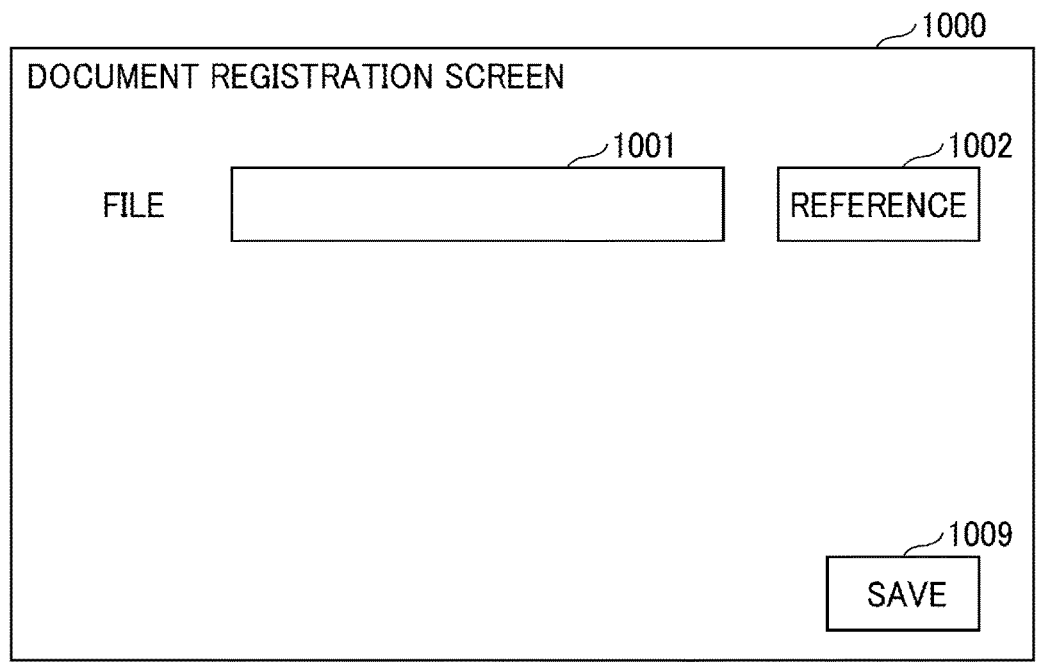
FIG. 6 is a diagram illustrating an example of a document registration screen according to an embodiment of the present disclosure.

Here, a description is given of the document registration screen according to the present embodiment with reference to FIG. 6. FIG. 6 is a diagram illustrating an example of the document registration screen according to the present embodiment.

As illustrated in FIG. 6, a document registration screen 1000 according to the present embodiment includes a file input field 1001, a reference button 1002, and a save button 1009.

The file input field 1001 receives an input of information indicating a location of an electronic file corresponding to a document to be registered. The information indicating the location of the electronic file may be an absolute path, a relative path, or information described in a uniform resource identifier (URI) format indicating a file on another apparatus.

When the requester presses the reference button 1002, a dialog for selecting a file starts. The requester selects a file using the dialog for selecting a file to perform an input to the file input field 1001.

The document to be registered is a document to be processed by the document processing server 20. The document according to the present embodiment is electronic data representing a slip such as an invoice or the like.

When the requester presses the save button 1009, the reception unit 33 receives the input of the document specified by the content input to the file input field 1001.

The display control unit 32 displays a document information registration screen in response to the operation performed by the requester.

Figure 7:
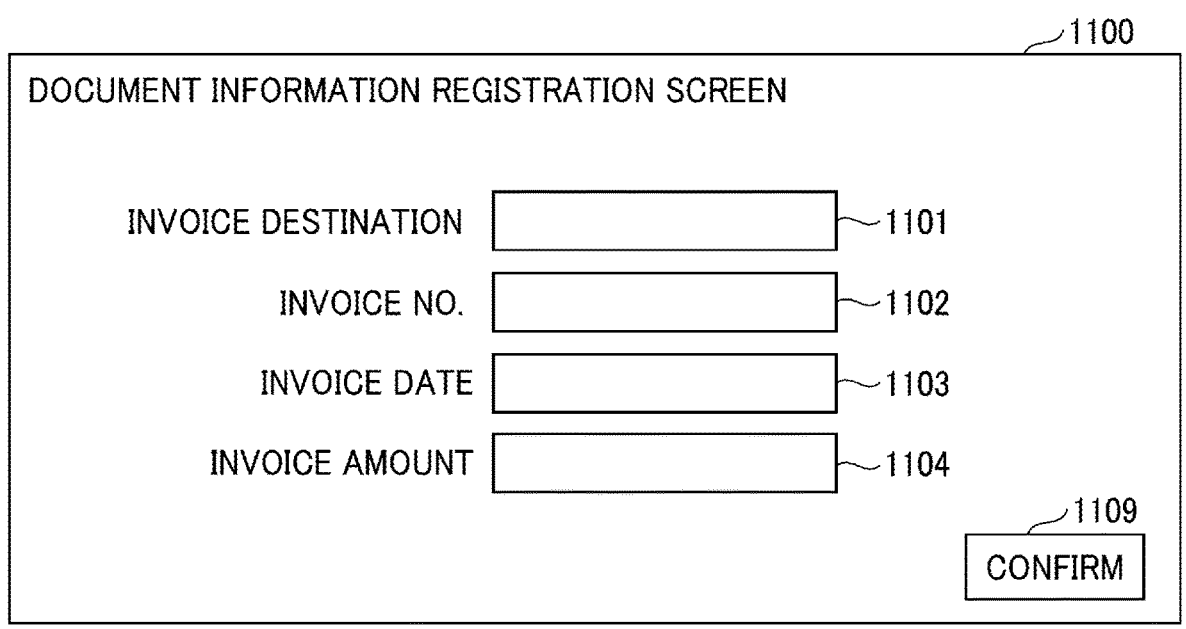
FIG. 7 is a diagram illustrating an example of a document information registration screen according to an embodiment of the present disclosure.

Here, a description is given of the document information registration screen according to the present embodiment with reference to FIG. 7. FIG. 7 is a diagram illustrating an example of the document information registration screen according to the present embodiment.

As illustrated in FIG. 7, a document information registration screen 1100 according to the present embodiment includes an invoice destination input field 1101, an invoice number input field 1102, an invoice date input field 1103, an invoice amount input field 1104, and a confirm button 1109. The requester can add an input field in the document information registration screen 1100, and change or delete each input field included in the document information registration screen 1100 as desired in accordance with the contents of processing.

The requester inputs an invoice destination, an invoice number, an invoice date, and an invoice amount described in an invoice into the invoice destination input field 1101, the invoice number input field 1102, the invoice date input field 1103, and the invoice amount input field 1104, respectively.

When the requester presses the confirm button 1109, the reception unit 33 receives the input of the invoice destination, the invoice number, the invoice date, and the invoice amount respectively input to the invoice destination input field 1101, the invoice number input field 1102, the invoice date input field 1103, and the invoice amount input field 1104. The reception unit 33 generates document information based on the invoice destination, the invoice number, the invoice date, and the invoice amount.

Here, a description is given of the document information according to the present embodiment with reference to FIG. 8. FIG. 8 is a table illustrating an example of the document information according to the present embodiment.

As illustrated in FIG. 8, the document information according to the present embodiment includes, as data items, document ID, an invoice destination, an invoice number, an invoice date, and an invoice amount.

The reception unit 33 requests the transmission and reception unit 31 to transmit the document received by the reception unit 33 and the document information generated by the reception unit 33 to the document management server 10. The transmission and reception unit 31 transmits the document and the document information to the document management server 10.

Returning to FIG. 5, the description continues. In step S2, the data reception unit 111 included in the document management server 10 receives the document (e.g., a slip) and the document information (e.g., slip information) from the user terminal 30-1. The data reception unit 111 requests the data management unit 12 to store the document received from the user terminal 30-1. Further, the data reception unit 111 requests the processing information transmission unit 112 to transmit the document information received from the user terminal 30-1 to the document processing server 20.

The data management unit 12 issues document ID for identifying the document received from the user terminal 30-1. Here, it is assumed that "ID-A" is issued as the document ID. The data management unit 12 stores the document ID in the metadata of the document received from the user terminal 30-1. In addition, the data management unit 12 stores the document and the metadata of the document in the data storage unit 100. At the same time, the data management unit 12 generates access information of the document stored in the data storage unit 100.

Here, a description is given of the metadata of the document according to the present embodiment with reference to FIG. 9. FIG. 9 is a table illustrating an example of the metadata of the document according to the present embodiment.

As illustrated in FIG. 9, the metadata of the document according to the present embodiment includes the document ID, file information, and the like as data items. The file information is information indicating a file corresponding to the document. For example, the file information may be a file name or an absolute path indicating the location of the file.

The table illustrated in FIG. 9 is merely an example, and a user can add a data item to be included in the metadata of the document, and change or delete each data item included in the metadata of the document as desired. Further, there may be a data item not set in the metadata of the document depending on a type of the document or a state of processing of the document.

Returning to FIG. 5, the description continues. In step S3, the processing information transmission unit 112 included in the document management server 10 transmits a processing request to process the document information to the document processing server 20. The processing request includes the document information and the access information.

The processing information transmission unit 112 may transmit the document information and the access information separately to the document processing server 20. In such a case, the processing information transmission unit 112 sequentially transmits a processing request including the document information as a first processing request and a processing request including the access information as a second processing request to the document processing server 20.

In step S4, the processing information reception unit 211 included in the document processing server 20 receives the processing request from the document management server 10. The processing information reception unit 211 requests the storage control unit 22 to store the document information (slip information) and the access information included in the processing request received from the document management server 10.

The storage control unit 22 generates slip information based on the document information. Then, the storage control unit 22 issues slip ID for identifying the slip information. Here, it is assumed that "ID-B" is issued as the slip ID. The storage control unit 22 stores the slip ID in the metadata of the slip information. In addition, the storage control unit 22 stores the slip information and the metadata of the slip information in the data storage unit 200.

In step S5, the storage control unit 22 included in the document processing server 20 stores the access information in the metadata of the slip information. Accordingly, the slip ID and the access information are associated with each other in the metadata of the slip information.

Here, a description is given of the metadata of the slip information according to the present embodiment with reference to FIG. 10. FIG. 10 is a table illustrating an example of the metadata of the slip information according to the present embodiment.

As illustrated in FIG. 10, the metadata of the slip information according to the present embodiment includes the slip ID, the access information, and the like as data items.

The table illustrated in FIG. 10 is merely an example, and a user can add a data item to be included in the metadata of the slip information, and change or delete each data item included in the metadata of the slip information as desired. Further, there may be a data item not set in the metadata of the slip information depending on a state of processing of the slip information.

Returning to FIG. 5, the description continues. In step S6, the storage control unit 22 included in the document processing server 20 requests the transmission and reception unit 21 to transmit a registration completion notification to the document management server 10. The transmission and reception unit 21 transmits the registration completion notification to the document management server 10.

In step S7, the transmission and reception unit 11 included in the document management server 10 receives the registration completion notification from the document processing server 20. The transmission and reception unit 11 transmits the registration completion notification received from the document processing server 20 to the user terminal 30-1.

In step S8, the display control unit 32 included in the user terminal 30-2 displays a slip list screen in response to an operation performed by the processing executor. The display control unit 32 may authenticate the processing executor prior to displaying the slip list screen, and display the slip list screen in a case where the authentication is successful. In the following description, it is assumed that the processing executor is successfully authenticated.

Here, a description is given of the slip list screen according to the present embodiment with reference to FIG. 11. FIG. 11 is a diagram illustrating an example of the slip list screen according to the present embodiment.

As illustrated in FIG. 11, a slip list screen 2000 according to the present embodiment includes a slip list display field 2010, a search condition input field 2020, a total button 2030, and the like.

In the slip list display field 2010, a list of pieces of the slip information managed by the document processing server 20 is displayed. When search conditions are input to the search condition input field 2020 and the total button 2030 is pressed, the list of pieces of the slip information displayed in the slip list display field 2010 is narrowed down to a list of pieces of the slip information that match the search conditions.

When the processing executor performs an operation of selecting (for example, clicking) a piece of the slip information in the slip list display field 2010, the reception unit 33 requests the transmission and reception unit 31 to transmit an acquisition request to acquire a slip processing screen to the document processing server 20. The transmission and reception unit 31 transmits the acquisition request to acquire the slip processing screen to the document processing server 20. The acquisition request includes the slip ID of the piece of the slip information to be processed. The piece of the slip information is selected in the slip list display field 2010.

Returning to FIG. 5, the description continues. In step S9, the transmission and reception unit 21 included in the document processing server 20 receives, from the user terminal 30-2, the acquisition request to acquire the slip processing screen. The transmission and reception unit 21 transmits the acquisition request to acquire the slip processing screen to the screen information generation unit 23.

The screen information generation unit 23 receives the acquisition request to acquire the slip processing screen from the transmission and reception unit 21. The screen information generation unit 23 acquires screen information representing the slip processing screen from the screen information storage unit 210. In addition, the screen information generation unit 23 requests the slip information associated with the slip ID included in the acquisition request from the storage control unit 22.

The storage control unit 22 acquires, from the data storage unit 200, the slip information identified by the slip ID included in the acquisition request. Then, the storage control unit 22 transmits the slip information acquired from the data storage unit 200 to the screen information generation unit 23.

In step S10, the screen information generation unit 23 embeds the slip information received from the storage control unit 22 into the screen information acquired from the screen information storage unit 210. Thereby, the screen information representing the slip processing screen to be transmitted to the user terminal 30-2 is generated.

In step S11, the screen information generation unit 23 requests the screen information transmission unit 212 to transmit the screen information representing the slip processing screen to the user terminal 30-2. The screen information transmission unit 212 transmits the screen information representing the slip processing screen to the user terminal 30-2.

In step S12, the transmission and reception unit 31 included in the user terminal 30-2 receives the screen information representing the slip processing screen from the document processing server 20. The transmission and reception unit 31 transmits the screen information received from the document processing server 20 to the display control unit 32. The display control unit 32 causes the display 506 to display the slip processing screen based on the screen information.

Here, a description is given of the slip processing screen according to the present embodiment with reference to FIG. 12. FIG. 12 is a diagram illustrating an example of the slip processing screen according to the present embodiment.

As illustrated in FIG. 12, a slip processing screen 2100 according to the present embodiment includes a slip detail display field 2110. In the slip detail display field 2110, details of pieces of the slip information to be processed are displayed. Each piece of the slip information displayed in the slip detail display field 2110 includes a link 2111 for accessing the original document. In the link 2111, access information associated with each piece of the slip information is displayed.

Returning to FIG. 5, the description continues. In step S13, the reception unit 33 included in the user terminal 30-2 receives a user operation (for example, clicking the link 2111) to the link 2111 on the slip processing screen 2100. The display control unit 32 causes the display 506 to display an authentication screen.

Here, a description is given of the authentication screen according to the present embodiment with reference to FIG. 13. FIG. 13 is a diagram illustrating an example of the authentication screen according to the present embodiment.

As illustrated in FIG. 13, an authentication screen 3000 according to the present embodiment includes a user name input field 3001, a password input field 3002, and a login button 3009.

When the processing executor presses the login button 3009, the reception unit 33 receives an input of authentication information. The authentication information includes a user name and a password respectively input to the user name input field 3001 and the password input field 3002.

The transmission and reception unit 31 transmits an acquisition request to acquire the document to the document management server 10. The acquisition request includes the authentication information and the access information.

Returning to FIG. 5, the description continues. In step S14, the acquisition request reception unit 113 included in the document management server 10 receives the acquisition request to acquire the document from the user terminal 30-2. The acquisition request reception unit 113 transmits the acquisition request received from the user terminal 30-2 to the screen information generation unit 13.

The screen information generation unit 13 receives the acquisition request to acquire the document from the acquisition request reception unit 113. The screen information generation unit 13 uses the authentication information included in the acquisition request to authenticate the processing executor. In the following description, it is assumed that the processing executor is successfully authenticated.

Subsequently, the screen information generation unit 13 acquires screen information representing a document browsing screen from the screen information storage unit 110. In addition, the screen information generation unit 13 requests the document indicated by the access information included in the acquisition request from the data management unit 12.

The data management unit 12 acquires the document stored in the data storage unit 100 based on the access information included in the acquisition request. The data management unit 12 transmits the document acquired from the data storage unit 100 to the screen information generation unit 13.

In step S15, the screen information generation unit 13 embeds the document received from the data management unit 12 into the screen information acquired from the screen information storage unit 110. Thereby, the screen information representing the document browsing screen to be transmitted to the user terminal 30-2 is generated.

In step S16, the screen information generation unit 13 included in the document management server 10 requests the screen information transmission unit 114 to transmit the screen information representing the document browsing screen to the user terminal 30-2. The screen information transmission unit 114 transmits the screen information representing the document browsing screen to the user terminal 30-2.

In step S17, the transmission and reception unit 31 included in the user terminal 30-2 receives the screen information representing the document browsing screen from the document management server 10. The transmission and reception unit 31 transmits the screen information received from the document management server 10 to the display control unit 32. The display control unit 32 causes the display 506 to display the document browsing screen based on the screen information received from the transmission and reception unit 31.

Here, a description is given of the document browsing screen according to the present embodiment with reference to FIG. 14. FIG. 14 is a diagram illustrating an example of the document browsing screen according to the present embodiment.

As illustrated in FIG. 14, a document browsing screen 3100 according to the present embodiment includes a document outline display field 3110 and a document display field 3120. In the document outline display field 3110, the document information indicated by the access information included in the acquisition request is displayed. In the document display field 3120, the contents of the document displayed in the document outline display field 3110 are displayed.

In the information processing system according to the present embodiment, the document processing server stores document ID (slip ID) for identifying document information and access information for accessing a document managed by the document management server in association with each other. The document processing server embeds the access information into screen information representing a screen for processing the document and transmits the screen information to a user terminal. The user terminal transmits an acquisition request to acquire the document to the document management server in accordance with an operation to the access information. The document management server transmits screen information representing a document browsing screen to the user terminal in response to the acquisition request from the user terminal.

As a result, the information processing system according to the present embodiment allows the processing executor to easily access a document managed by the document management server from a screen which the document processing server provides the user terminal with. For this reason, the processing executor does not have to grasp the information to access the document managed by the document management server in advance, resulting in an efficient operation.

Modification

In the above-described embodiment, an example has been described in which the document processing server is an accounting system that executes accounting processing using accounting information indicated on a slip such as an invoice. The document processing server can electronically execute processing on not only a document but also various types of electronic data.

For example, the information processing system according to the present embodiment can be used for data analysis processing in the field of bioinformatics. In this case, the document processing server provides a service for analyzing high molecular weight proteins, for example.

In this modification, the document processing server in the above embodiment is referred to as an information processing apparatus, and the document management server is referred to as a data management apparatus.

An information processing method in the present modification is described in detail below. A user of a service provided by the information processing apparatus registers experimental data on a high molecular weight protein to be analyzed in the data management apparatus. The data management apparatus transmits information representing the contents of the experimental data and access information for accessing the experimental data to the information processing apparatus.

The information processing apparatus transmits screen information for displaying the contents of the experiment data and the access information to a user terminal. The user performs an operation (for example, clicking a link displayed on the screen) on the screen which the information processing apparatus provides the user terminal with. The user terminal transmits an acquisition request to acquire the experimental data to the data management apparatus in accordance with an operation performed by the user.

The data management apparatus transmits screen information for displaying the experimental data to the user terminal in response to the acquisition request from the user terminal. The user terminal causes a display to display a screen for displaying the experimental data according to the screen information.

With such a configuration, the information processing apparatus according to the present modification allows the user to easily access the experimental data managed by the data management apparatus from the screen which the information processing apparatus provides the user terminal with.

In the above-described embodiment, the document management server 10 is an example of a data management apparatus. The document processing server 20 is an example of an information processing apparatus. The information processing system 1 is an example of a data management system. The document is an example of data. The processing information transmission unit 112 is an example of an access information transmission unit. The processing information reception unit 211 is an example of an access information reception unit.

Each of the functions of the above-described embodiment may be implemented by one or more processing circuits or circuitry. The "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

The apparatuses or devices described in the above-described embodiment are merely one example of plural computing environments that implement the embodiment disclosed herein. In some embodiments, each of the document management server 10 and the document processing server 20 includes a plurality of computing devices, such as a server cluster. The plurality of computing devices communicates with one another through any type of communication link including, for example, a network or a shared memory, and performs the operations described in the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A system comprising an invoice data management server, an information processing server and a first information processing terminal, wherein the invoice data management server is configured to:
store original document data in a memory of the invoice data management server;
generate a uniform resource locator (URL) for accessing the stored original document data; and
transmit the URL to the information processing server via a network;

wherein the information processing server is configured to:
receive, from the invoice data management server, document information and the URL;
generate electronic invoice data based on the received document information;
electronically execute accounting processing using the electronic invoice data;

transmit, in response to receiving a first request requesting a first screen information from the first information processing terminal connected via the network, a first screen information including the electronic invoice data and the URL to the first information processing terminal; and wherein the invoice data management server is further configured to:
receive a second request and an authentication information that are transmitted from the first information processing terminal in response to an operation on the URL through a first screen based on a first screen information performed by a user, wherein the second request is for requesting acquisition of the original document data and includes the URL;
execute an authentication processing based on the authentication information; and
transmit, in response to receiving the second request, a second screen information generated based on the URL to the first information processing terminal, wherein a second screen based on the second screen information is for displaying the electronic invoice data; and wherein the first information processing terminal is configured to:
transmit the first request to the information processing server;
receive the first screen information from the information processing server;
display the first screen based on the first screen information, wherein the first screen, which embeds the electronic invoice data and the URL, receives the operation on the URL by the user;
in response to receiving the operation, display an authentication screen for inputting the authentication information;
transmit the second request based on the URL and the authentication information to the invoice data management server, in response to receiving the operation; and
in response to receiving the second screen information from the invoice data management server, display the second screen that shows the original document data stored in the invoice data management server.

2. The system according to claim 1,
wherein the invoice data management server is further configured to:
send a third screen information to a second information processing terminal, wherein a third screen represented by the third screen information is for receiving registration;
receive an electronic invoice data input by the user through the third screen from the second information processing terminal;
generate the URL for accessing the stored electronic invoice data; and
transmit the electronic invoice data and the URL to the information processing server; and wherein the information processing server is further configured to:
send the first screen information, which includes the URL and at least a portion of the electronic invoice data, to the first information processing terminal.

3. An invoice data management method comprising:
storing original document data in a memory of an invoice data management server;
generating a uniform resource locator (URL) for accessing the stored original document data by the invoice data management server;
transmitting, from the invoice data management server, the URL to an information processing server via a network, wherein the URL is for accessing the stored original document data;
receiving, by the information processing server, document information and the URL from the invoice data management server;
generating electronic invoice data based on the received document information by the information processing server;
electronically executing, by the information processing server, accounting processing using the electronic invoice data;
transmitting, by the information processing server, in response to receiving a first request requesting a first screen information from a first information processing terminal connected via the network, first screen information including the electronic invoice data and the URL to the first information processing terminal;
displaying, by the first information processing terminal, the first screen based on the first screen information, wherein the first screen, which embeds the electronic invoice data and the URL, receives an operation on the URL by the user;
in response to receiving the operation, display an authentication screen for inputting an authentication information by the first information processing terminal;
receiving, by the invoice data management server, a second request and an authentication information that are transmitted from the first information processing terminal in response to the operation on the URL, wherein the second request is for requesting acquisition of the original document data and includes the URL;
executing, by the invoice data management server, an authentication processing based on the authentication information; and
transmitting, from the invoice data management server to the first information processing terminal in response to receiving the second request, a second screen information generated based on the URL, wherein a second screen based on the second screen information is for displaying the original document data stored in the invoice data management server.

4. A non-transitory recording medium carrying computer readable codes for controlling a computer system to perform a method, the method comprising:
storing original document data in a memory of an invoice data management server;
generating a uniform resource locator (URL) for accessing the stored original document data by the invoice data management server;
transmitting, from the invoice data management server, the URL to an information processing server via a network, wherein the URL is for accessing the stored original document data;
receiving, by the information processing server, document information and the URL from the invoice data management server;
generating electronic invoice data based on the received document information by the information processing server;
electronically executing, by the information processing server, accounting processing using the electronic invoice data;

transmitting, by the information processing server, in response to receiving a first request requesting a first screen information from a first information processing terminal connected via the network, first screen information including the electronic invoice data and the URL to the first information processing terminal;

displaying, by the first information processing terminal, the first screen based on the first screen information, wherein the first screen, which embeds the electronic invoice data and the URL, receives an operation on the URL by the user;

in response to receiving the operation, display an authentication screen for inputting an authentication information by the first information processing terminal;

receiving, by the invoice data management server a second request and an authentication information that are transmitted from the first information processing terminal in response to the operation on the URL, wherein the second request is for requesting acquisition of the original document data and includes the URL;

executing, by the invoice data management server, an authentication processing based on the authentication information; and transmitting, from the invoice data management server to the first information processing terminal in response to receiving the second request, a second screen information generated based on the URL, wherein a second screen based on the second screen information is for displaying the original document data stored in the invoice data management server.

* * * * *